(12) United States Patent
Lorbeer et al.

(10) Patent No.: US 12,413,308 B2
(45) Date of Patent: Sep. 9, 2025

(54) SYSTEM AND METHOD FOR OPTICAL COMMUNICATION

(71) Applicant: DEUTSCHES ZENTRUM FÜR LUFT—UND RAUMFAHRT E.V., Bonn (DE)

(72) Inventors: Raoul-Amadeus Lorbeer, Magstadt (DE); Benjamin Ewers, Böblingen (DE)

(73) Assignee: DEUTSCHES ZENTRUM FÜR LUFT—UND RAUMFAHRT E.V., Bonn (DE)

( * ) Notice: Subject to any disclaimer, the term of this patent is extended or adjusted under 35 U.S.C. 154(b) by 246 days.

(21) Appl. No.: 18/031,963

(22) PCT Filed: Oct. 18, 2021

(86) PCT No.: PCT/EP2021/078842
§ 371 (c)(1),
(2) Date: Apr. 14, 2023

(87) PCT Pub. No.: WO2022/084264
PCT Pub. Date: Apr. 28, 2022

(65) Prior Publication Data
US 2023/0396334 A1 Dec. 7, 2023

(30) Foreign Application Priority Data
Oct. 22, 2020 (DE) ...................... 10 2020 127 891.8

(51) Int. Cl.
*H04B 10/114* (2013.01)
(52) U.S. Cl.
CPC ..... *H04B 10/1141* (2013.01); *H04B 10/1149* (2013.01)

(58) Field of Classification Search
None
See application file for complete search history.

(56) References Cited

U.S. PATENT DOCUMENTS 6,844,947 B2 * 1/2005 Salehi .................. H04J 14/005
382/210
7,136,587 B1 * 11/2006 Davis ................. H04B 17/3912
398/118

(Continued)

FOREIGN PATENT DOCUMENTS

DE 102010031629 A1 1/2012
DE 102014213970 A1 1/2016

(Continued)

OTHER PUBLICATIONS

International Search Report (Jan. 31, 2022) for corresponding International App. PCT/EP2021/078842.

(Continued)

*Primary Examiner* — Jai M Lee
(74) *Attorney, Agent, or Firm* — WRB-IP PLLC

(57) ABSTRACT

A system for optical communication includes at least one light source for transmitting optical signals, at least one optical receiving unit for receiving the optical signals of the at least one light source, at least one mask unit, which is arranged between the optical receiving unit and the at least one light source, and which is designed to be switchable back-and-forth at least in areas between an at least partially optically non-forwarding and at least partially optically forwarding state. An image of at least one light-emitting area of the at least one light source can be imaged onto the at least one mask unit and in the at least partially forwarding state of the at least one mask unit can be conducted to the receiving unit. A method for optical communication is also provided.

25 Claims, 7 Drawing Sheets

(56) References Cited

U.S. PATENT DOCUMENTS

| | | | | |
|---|---|---|---|---|
| 8,879,917 | B2* | 11/2014 | Deguchi | H04N 21/4722 |
| | | | | 398/118 |
| 9,893,809 | B2* | 2/2018 | Kim | H04B 10/116 |
| 10,505,629 | B2* | 12/2019 | Little | H04B 10/61 |
| 11,722,892 | B2* | 8/2023 | Bendahan | H04B 10/524 |
| | | | | 726/4 |
| 2009/0002265 | A1* | 1/2009 | Kitaoka | H04N 13/305 |
| | | | | 345/55 |
| 2009/0040516 | A1* | 2/2009 | Fritz | G01J 3/02 |
| | | | | 356/330 |
| 2011/0129228 | A1* | 6/2011 | McFadden | H04B 10/1141 |
| | | | | 398/118 |
| 2015/0286340 | A1* | 10/2015 | Send | G01S 17/66 |
| | | | | 250/206.1 |

FOREIGN PATENT DOCUMENTS

| | | | |
|---|---|---|---|
| DE | 102017213294 A1 | 2/2019 | |
| DE | 102017130903 A1 | 6/2019 | |
| WO | WO-2006125975 A1 * | 11/2006 | ............ H04N 23/58 |
| WO | 2008068544 A1 | 6/2008 | |
| WO | 2016150890 A1 | 9/2016 | |

OTHER PUBLICATIONS

German Official Action (Jul. 21, 2021) for corresponding German App. 10 2020 127 891.8.

* cited by examiner

SYSTEM AND METHOD FOR OPTICAL COMMUNICATION

BACKGROUND AND SUMMARY

The invention relates to a system and a method for optical communication.

Location-accurate virtual representation of items of information from a wide variety of electrical devices is important in connection with applications of virtual and/or augmented reality (referred to as virtual reality (VR)/augmented reality (AR)). A practical example here is the simple transmission of electrical signals from measuring instruments (thermometer, multimeter, anemometer, power meter, . . . ) according to the RS 232 or RS 485 standard, for example, or status messages from systems (laser, refrigerator, pump, substation, . . . ), even over longer distances, which makes it easier to read displays.

DE 102010031629 B4 discloses a system for determining a position of a moving object using an arrangement having three general lighting LEDs, wherein a first general lighting LED of the three general lighting LEDs is designed to transmit a first light signal, which includes first transmission time information and first transmitter information in a first wavelength range.

The first transmitter information enables a determination of a position of the first general lighting LED and the first transmission time information enables information about a point in time at which the first signal was transmitted, wherein a second general lighting LED of the at least three general lighting LEDs is designed to transmit a second light signal having second transmission time information and second transmitter information in a second wavelength range.

The second transmitter information enables at least a determination of a position of the second general lighting LED. The second transmission time information is information about a point in time at which the second signal was transmitted, wherein a third general lighting LED of the at least three general lighting LEDs is designed to transmit a third light signal which includes third transmission time information and third transmitter information in a third wavelength range.

The third transmitter information enables at least one determination of a position of the third general lighting LED, and the third transmission time information is information about a point in time at which the third signal was transmitted, wherein the first wavelength range, the second wavelength range, and the third wavelength range at least partially overlap in an overlapping range.

The known system furthermore includes a light sensor which is fastened on the movable object and is designed to receive the first to third light signals in the overlapping range and to assign a first signal reception time to the first light signal, a second signal reception time to the second light signal, and a third signal reception time to the third light signal.

It is desirable to specify an improved system for optical communication with electrical devices.

It is also desirable to specify an improved method for optical communication with electrical devices.

According to one aspect of the invention, a system for optical communication is proposed, comprising at least one light source for transmitting optical signals, in particular serial optical signals; at least one optical receiving unit for receiving the optical signals of the at least one light source, wherein the optical receiving unit includes at least one photodetector; at least one mask unit, which is arranged between the optical receiving unit and the at least one light source, and which is designed to be switchable back and forth at least in some areas between an at least partially optically non-forwarding and at least partially optically forwarding state. An image of at least one light-emitting area of the at least one light source can be imaged on the at least one mask unit and can be transmitted to the receiving unit in the at least partially forwarding state of the at least one mask unit.

A clear distance between the at least one mask unit and/or its image on the at least one receiving unit and an entrance aperture of the at least one receiving unit is at most sufficiently large that a light cone of the image, forwarded by the mask unit, of at least one light-emitting area of the at least one light source corresponds at most to the entrance aperture of the at least one photodetector of the receiving unit.

The distance requirement preferably follows from the detector size and/or the sub-apertures of the individual photodetectors. In this way, crosstalk between different photodetectors can advantageously be reduced or even avoided.

Optically forwarding is to mean that the optical signal from the at least one light source can pass through the mask unit. Optically non-forwarding is to mean that the optical signal cannot pass through the mask unit. The term forwarding can be understood to mean that the light is transmitted through the mask or diffracted or reflected or absorbed. In this way, signals can be forwarded as black-and-white signals or in shades of gray.

The light sources emit optical signals which are imaged on the mask unit. In the area toward which the image of the light source is projected, the mask unit can deliberately be switched to be at least partially forwarding, for example transparent or transmitting or reflecting, so that the optical signal is conducted to the receiving unit, where it can be received and forwarded to a data processing system.

In this way, individual light sources can be deliberately transmitted or hidden via the mask unit.

The system according to an aspect of the invention is based on optical, in particular serial, data transmission using light sources, which can be in the form of infrared (IR) light sources, for example. There are various coding methods for this purpose. A well-known coding method is described, for example, via the specifications of the Infrared Data Association (IrDA), for example in "Infrared Data Association Serial Infrared Physical Layer Specification" Version 1.4, May 30, 2001 (https://www.irda.org/standards/pubs/IrPHY_1p4.pdf).

It is optionally possible to use light-sensitive, in particular infrared light-sensitive line or matrix sensors, in order to identify and locate the light sources.

Dynamic shadowing/masking via a mask unit is also used in order to improve the signal-to-noise ratio, in particular for specific angles of incidence of the optical signals.

This feature can be combined with an arrangement, in particular an array of photodetectors, for example photodiodes, in order to be able to receive multiple light sources at the same time.

In this way, the system allows a kind of "camera-supported optical data multiplexing". This allows signal sources that would otherwise strike the same detector to be deliberately suppressed in a simple manner, without having to structure the detector in an electrically complex manner.

For example, an optically emitting data source, such as an LED or laser diode, can be used as the light source. Entire emission surfaces can also be used with the system.

The system can optionally comprise a camera having a wide field of view for locating the light sources, which has sensitivity in the infrared light spectrum. Such cameras are widespread in VR/AR applications.

An optics unit can be used to image a light source on the mask unit, which can be designed, for example, as an at least partially forwarding, location-resolving addressable dynamic mask. The dynamic mask can be designed, for example, as a liquid crystal (TFT) screen (TFT=thin film transistor). It is also possible, for example, to use a micromirror actuator or LCoS (LCoS=Liquid Crystal on Silicon) display, in particular in the form of a so-called DLP chip (DLP=Digital Light Processing). The dynamic mask can now be selectively switched at points to be at least partially forwarding for the infrared light sources located with the aid of the camera, so that the light signal data can be received.

The dynamic mask can, for example, also be designed to be switchable between a transparent and a non-transparent state. Furthermore, it is also possible that the dynamic mask is designed as a light-diffractive component which is switchable between a forwarding state and a non-forwarding state by a switchable diffraction effect.

Furthermore, it is also possible that the dynamic mask is designed as a polarization-rotating component which is switchable between a forwarding state and a non-forwarding state by a switchable birefringence effect in combination with polarizer and analyzer.

Switching between the forwarding state and a non-forwarding state takes place dynamically, so that, for example, movements of the system can be compensated for. The light that is still transmitted is thus incident on one of the detectors of the receiving unit arranged behind it. Multiple photodetectors can advantageously be used here, for example a photodiode array, in order to be able to process multiple signals in parallel.

The data obtained in this way can be displayed accurately to location in VR/AR systems. With a sufficiently bright lens as the optics unit, the communication can also take place over greater distances.

If a fill factor of the detector array is not large enough because there are gaps between the individual detectors, then converging lenses can additionally be used, which bundle the light onto the individual detectors.

The system can advantageously comprise a camera for locating the light source and an optics unit for imaging the light source on the mask unit. The use of a mask unit in the form of a transmitting mask offers significant advantages with respect to a compact size of the system. Here, the transmission of partially or fully forwarding states is possible when choosing the mask. A very compact size can be achieved for the system, in particular if the receiving unit directly abuts the mask unit. A large acceptance angle in the intermediate image of the light source onto the mask unit can thus also be allowed, as a result of which more compact systems are possible.

Advantageously, the distance between the at least one mask unit and/or its image onto the at least one receiving unit and the entrance aperture of the at least one receiving unit corresponds at most to a quotient of a diameter of the entrance aperture of at least one photodetector of the receiving unit and an f-number of an optics unit in the beam path between the at least one light source and the at least one mask unit, in order to avoid crosstalk between different photodetectors.

The smallest possible distance between the mask unit and the entrance aperture means that the mask or its optical image is not farther away than a distance $\Delta z$ from the entrance aperture with effective diameter D of a single photodetector, wherein the distance $\Delta z$ results from:

$$\Delta z \leq D/(2 \sin(\alpha))$$

wherein $\alpha$ is half the aperture angle of the imaged light source.

For an objective having a focal length f, $2 \sin(\alpha)$ corresponds to the f-number, i.e. at f-number f/2 the maximum distance corresponds to twice the diameter D of the entrance aperture of the photodetector. In this way, permanent crosstalk between adjacent photodetectors can be avoided, which could result with a larger distance and which could thus impair the usability of the system.

An identifier, for example an ID or a tag, can advantageously be provided for the transmission protocol of the optical signals, which identifier additionally provides information about the transmitted content of the optical signals. In this way, different types of information can be effectively pre-filtered.

By using a common imaging optics unit, an increased range can be achieved for all light receivers.

A data reduction can be achieved by arranging multiple photodiodes in the receiving unit, which can utilize signals separately. Multiple light sources can also be received simultaneously in this way. It is also possible to sequentially activate light sources that are close together and nonetheless separate them cleanly.

An aspect of the invention makes it possible to locate existing information sources simultaneously and still achieve a higher data rate, for example 1 Mbit/s. If the photoemitters are close together, they can be queried sequentially.

Another advantage of the system is the potential compatibility, with respect to electrical and software interfaces, with optical data communication standards such as the standards of the Infrared Data Association (IrDA), so that the connection to many signal sources is provided in the simplest possible way.

The system according to an aspect of the invention can advantageously be used in a VR/AR environment for reading various instruments, even from a distance. This can take place, for example, in dangerous environments having safety equipment or in laboratories.

The system can be used for aesthetic reasons, for example as hidden displays, in space travel, in AR-assisted surgery. The system can be used, for example, in patrols in large facilities, in tourist information systems (AR guides), or in advertising, for example as a virtual shop window.

According to an advantageous embodiment of the system, a locating unit, in particular a camera, can be provided for locating the at least one light source. The light sources can be located, for example, by means of standard digital cameras that are sensitive enough in the wavelength range of the optical signals. In this way, the mask unit can be deliberately activated using the location information of the light source and can be switched to be at least partially forwarding.

According to an advantageous embodiment of the system, the at least one mask unit can have at least one dynamic mask that is addressable with location resolution and is switchable at least partially between at least partially optically non-forwarding and at least partially optically forwarding states. The dynamic mask can now be selectively switched at points to be at least partially forwarding for the infrared light sources located with the aid of the camera, so that the light signal data can be received.

According to an advantageous embodiment of the system, an optics unit can be arranged in the beam path between the at least one light source and the at least one mask unit.

The optics unit can be used to image a light source on the at least one mask unit, which can be designed as an at least partially forwarding, location-resolving addressable dynamic mask. This allows optical signals from selected light sources to be transmitted to the receiving unit in a targeted manner.

According to an advantageous embodiment of the system, a birefringent optical element and/or a diffractive optical element can be arranged in the beam path between the optics unit and the at least one mask unit. In particular, a delay element, for example a quarter-wave plate or a half-wave plate or the like, can be arranged between the optics unit and the birefringent optical element and/or the diffractive optical element.

In order to avoid blind spots on a photodetector array of the receiving unit, it is preferable to install a diffractive optical element (DOE) and/or a birefringent optical element (BOE) before or after the mask unit. In this way, two or more optical images of the light source can be projected onto different areas of the detector array, so that at least one image always illuminates a photodetector on its sensitive aperture.

A quarter-wave plate can also be installed in front of the BOE. When installed correctly, left and right circularly polarized light can be converted into vertically and horizontally polarized light beams that are aligned with the BOE. With a sufficiently large spatial separation, these can be read out separately. With circularly polarized light, this functions independently of the alignment perpendicular to the line of sight between the receiver unit and the light source.

According to an advantageous embodiment of the system, a birefringent optical element, followed by a polarization-rotating element, can be arranged in the beam path between the optics unit and the at least one mask unit. In particular, the mask unit can include at least one polarizer, followed by a dynamic mask, followed by an analyzer. In particular, a delay element, for example a quarter-wave plate or the like, can be arranged between the optics unit and the birefringent optical element and/or the diffractive optical element. Furthermore, in particular the polarization-rotating element can be integrated into the dynamic mask.

Furthermore, it is also possible for the dynamic mask to be designed as a polarization-rotating component which is switchable between a forwarding state and a non-forwarding state by a switchable birefringence effect in combination with polarizer and analyzer.

To maximize the signal transmission through the mask unit by means of an LCD unit, it is possible to combine a birefringent optical element with a polarization-rotating LCD element, in particular as a half-wave delay element, which is designed as a polarization-rotating component analogously to the design of a dynamic mask, which is switchable between a polarization-rotating state and a non-polarization-rotating state. In this way, both polarization components of the transmitted light beams can be separated and components that are mismatched in polarization for the mask unit can be controlled separately, so that a large part of the light is incident on the photodetectors.

According to one advantageous embodiment of the system, a further optics unit can be arranged in the beam path between the receiving unit and the at least one mask unit.

The image of the light source on the at least one mask unit can thus be imaged on the receiving unit. In this way it is possible to image the optical signals at least partially in a punctiform manner in order to achieve a high resolution and a good signal-to-noise ratio.

According to an advantageous embodiment of the system, the at least one mask unit can include at least two dynamic masks. In particular, the at least one mask unit can include at least two dynamic masks activatable separately from one another. If the position of the light source is not known, it is also possible to narrow down and thus track relevant signal sources by skillfully at least partially iteratively, alternately switching at least partially forwarding mask units. This means that the light sources can also be located without a camera.

Furthermore, the design of the mask unit has the advantage that a higher optical contrast for background suppression can be achieved, and that a simple approximation to a focusability of the mask unit can be achieved. As a result, the contrast can be improved at different distances of the light sources, even when multiple light sources are detected simultaneously.

According to an advantageous embodiment of the system, at least one further optics unit can be arranged in the beam path before the at least one dynamic mask and/or after the at least one dynamic mask or between at least two dynamic masks. In particular, the optics unit can include at least one dispersive optical element between two diffractive or refractive optical elements.

In a further exemplary embodiment, the further optics unit can be supplemented by a dispersive optical element, for example a transmittive or reflective grating or a prism. This enables spectral splitting of the light beams onto multiple detectors of the receiving unit. A linear arrangement of photodiodes having a large aspect ratio, i.e., an elongated formation, can make sense here in order to minimize the spacing of the photodiodes. Depending on the position of the light source, all spectral channels can thus be received simultaneously by the photodetectors. This allows many monochromatic data channels or fewer polychromatic data channels having higher bandwidth to be used in the same system architecture. In order to only deliberately address individual "sub-channels", it is also possible to install a further shading mask in front of the photodetectors and to block unwanted channels. In this way, the signal-to-noise ratio can be further optimized in bright surroundings without being restricted to a special wavelength.

According to an advantageous embodiment of the system, the at least one light source can include at least one LED and/or at least one photoemitter and/or at least one laser emitter. These represent common punctiform light sources, which can advantageously work in the infrared light spectrum.

Alternatively or additionally, the at least one light source can be designed for transmitting and the optical receiving unit for receiving optical signals as infrared radiation, in particular according to the standards of the IrDA. Optical serial data transmission can take place in particular by means of infrared (IR) light sources. There are various coding methods for this purpose. Well-known coding methods are described, for example, via the standards of the IrDA.

Alternatively or additionally, the optical receiving unit can include an arrangement of photodetectors, in particular an array of photodiodes. Multiple light sources can be received simultaneously via an arrangement of multiple photodetectors, in particular a rectangular array of photodetectors. In addition, it is possible to sequentially activate light sources that are close to one another and still separate them cleanly.

According to an advantageous embodiment of the system, the at least one mask unit can include at least one liquid crystal (TFT) screen as a dynamic mask. This type of screens can be switched in a simple manner so that they are addressable in a location resolved manner and are at least partially forwarding. They also represent common screens.

According to an advantageous embodiment of the system, the optical signals can include at least one identifier for processing and/or display. The optical signals can be selected and, in particular, filtered by means of this identifier. In this way, information can be deliberately extracted from the optical signals and various types of information can also be effectively pre-filtered.

According to an advantageous embodiment of the system, at least one light source for transmitting optical signals and the at least one optical receiving unit can be integrated in an optical transmission unit. As a result, a compact unit can be created which can both emit and receive optical signals. An electrical device for optical communication can thus be retrofitted in a simple manner.

According to a further aspect of the invention, a method for optical communication with a system as described above is proposed, wherein at least one light source emits optical signals, in particular serial optical signals. At least one optical receiving unit receives the optical signals, wherein the optical receiving unit includes at least one photodetector.

On at least one mask unit, which is arranged between the optical receiving unit and the at least one light source, and which can be switched back and forth at least in areas between an at least partially optically non-forwarding and at least partially optically forwarding state, an image of at least one light-emitting area of the at least one light source is imaged and is conducted in the at least partially forwarding state of the at least one mask unit to the receiving unit.

A clear distance between the at least one mask unit and/or its image on the at least one receiving unit and an entrance aperture of the at least one receiving unit is selected to be at most sufficiently large that a light cone of the image, forwarded by the mask unit, of the at least one light source corresponds at most to the entrance aperture of the at least one photodetector of the receiving unit.

According to an advantageous embodiment of the method, the at least one light source can be located by a locating unit, in particular a camera. In this way, the mask unit can be deliberately activated using the location information of the light source and switched to be at least partially forwarding. In this way, the optical signals can be deliberately selected via the mask unit and transmitted to the receiving unit.

According to an advantageous embodiment of the method, at least one light-emitting area of the at least one light source can be imaged via at least one optics unit onto at least one dynamic mask of the at least one mask unit, and the dynamic mask can be switched to the at least partially forwarding state on a section on which the optical signals of the at least one light source are incident on the at least one dynamic mask. The optics unit can be used to image the light-emitting area of a light source on the mask unit, which can be designed as an at least partially forwarding, location-resolving addressable dynamic mask.

This allows optical signals to be deliberately selected from light sources and transmitted to the receiving unit. By means of the dynamic mask, individual areas can also be selected from larger, two-dimensionally extended light sources, such as screens, in order to thus deliberately optically transmit information from screen contents.

According to an advantageous embodiment of the method, two or more images of the light-emitting area of the at least one light source can be imaged as separate images on different sections of the mask unit via a birefringent optical element and/or a diffractive optical element in the beam path between the optics unit and the at least one mask unit. In particular, the two or more images can be imaged via a delay element arranged between the optics unit and the birefringent optical element and/or the diffractive optical element. The delay element can be designed as a quarter-wave plate or the like.

In this way, blind spots on a photodetector array of the receiving unit can advantageously be avoided. In this way, two or more optical images of the light source can be projected onto different areas of the detector array, so that at least one image always illuminates a photodetector on its sensitive aperture.

According to an advantageous embodiment of the method, images of the light-emitting area of the at least one light source that are mismatched in polarization for the mask unit can be optically forwarded separately to the mask unit via a birefringent optical element followed by a polarization-rotating element in the beam path between the optics unit and the at least one mask unit, wherein the mask unit includes at least one polarizer followed by a dynamic mask followed by an analyzer. In particular, a delay element can be arranged between the optics unit and the birefringent optical element and/or the diffractive optical element.

In order to maximize the signal transmission through the mask unit by means of an LCD unit, both polarization components of the transmitted light beams can be separated and components mismatched in polarization for the mask unit can be controlled separately, so that a large part of the light is incident on the photodetectors.

According to an advantageous embodiment of the method, different circularly polarized images of the light-emitting area of the at least one light source can be optically forwarded separately to the mask unit via a delay element, for example a quarter-wave plate or the like, arranged between the optics unit and the birefringent optical element and/or the diffractive optical element.

When installed correctly, left and right circularly polarized light can be converted into vertically and horizontally polarized light beams that are aligned matching with the BOE. With a sufficiently large spatial separation, these can be read out separately.

According to an advantageous embodiment of the method, at least two dynamic masks of the at least one mask unit for optical signals from at least two light sources can be switched separately to the at least partially forwarding state. In particular, the optical signals of the at least two light sources can be activated sequentially. This allows information from two light sources to be processed separately.

This also has the advantage that a higher contrast for background suppression is achieved. Furthermore, a simple approximation to a focusability of the mask unit can be achieved in this way, so that the contrast is improved at different distances even when multiple light sources are detected simultaneously.

If the position of the light source is not known, it is thus possible to narrow down and thus track relevant signal sources by skillfully at least partially iteratively, alternately switching at least partially forwarding mask units. This means that the light sources can also be located without a camera.

According to a favorable embodiment of the method, the at least two light sources can be located simultaneously using the locating unit, in particular the camera.

In this way it is possible to locate existing information sources simultaneously and still achieve a higher data rate, for example 1 Mbit/s. If the photoemitters are close together as light sources, they can be queried sequentially.

According to an advantageous embodiment of the method, the optical signals of the at least one light source can be spectrally split via at least one further optics unit in the beam path before the at least one dynamic mask and/or after the at least one dynamic mask or between at least two dynamic masks. In particular, the optical signals of the at least one light source can be split via at least one dispersive optical element between two diffractive or refractive optical elements of the optics unit, wherein the image of the light-emitting area of the at least one light source is imaged spectrally resolved on the second dynamic mask.

This allows many monochromatic data channels or fewer higher bandwidth polychromatic data channels to be used in the same system architecture. In order to only deliberately address individual "sub-channels", it is also possible to install a further shading mask in front of the photodetectors and to block unwanted channels. In this way, the signal-to-noise ratio can be further optimized in bright surroundings without being restricted to a specific wavelength.

According to an advantageous embodiment of the method, the optical signals of the at least one light source can be transmitted in a location-resolved manner. A flatly extended light source can be imaged onto the mask unit, for example via an optics unit. An area on the mask unit can be deliberately addressed and at least partially switched to be forwarding, so that only the optical information that is imaged on this area is also forwarded to the receiving unit. In this way, optical signals of a light source can be deliberately transmitted to the receiving unit in a location-resolved manner.

The optical signals of the at least one light source can advantageously be transmitted directed towards the optical receiving unit.

By using at least two mask units, which are arranged one behind the other in terms of depth, a spatial direction in which the optical signals are transmitted in a directed manner can be selected via areas of the various mask units that are flatly offset and are at least partially switched to be forwarding.

A further possibility is the use of a laser emitter as a light source, which can direct optical signals in a targeted manner via at least one activatable deflection mirror in a desired spatial direction.

According to an advantageous embodiment of the method, the optical signals of the at least one light source can be evaluated in a data processing system. In particular, the optical signals can be displayed on a system for virtual and/or augmented reality. In this way, location-accurate virtual representations of information from a wide variety of electrical devices can be implemented in connection with VR/AR applications.

According to an advantageous embodiment of the method, the optical signals of the at least one light source can be processed and/or displayed by means of at least one identifier. The optical signals can advantageously be selected, in particular filtered. In this way, information can be deliberately extracted from the optical signals and various types of information in the optical signals can also be effectively pre-filtered.

BRIEF DESCRIPTION OF THE DRAWINGS

Further advantages will be apparent from the description of the drawings. Exemplary embodiments of the invention are shown in the figures. The figures, the description, and the claims contain numerous features in combination. A person skilled in the art will expediently also consider the features individually and combine them into further meaningful combinations.

In the exemplary figures:

FIG. 11 shows a detailed representation of a receiving process of optical signals via two masks of a mask unit of the system according to a further exemplary embodiment of the invention having a dispersive optical element arranged in between;

DETAILED DESCRIPTION

In the figures, identical or identically acting components are identified by the same reference signs. The figures only show examples and are not to be understood as restrictive.

Directional terminology used in the following with terms such as "left", "right", "above", "below", "in front of", "behind", "after", and the like only serves for better comprehension of the figures and is in no way intended to restrict the generality. The components and elements shown, their design and use can vary according to the considerations of a person skilled in the art and can be adapted to the respective applications.

Figure 1:
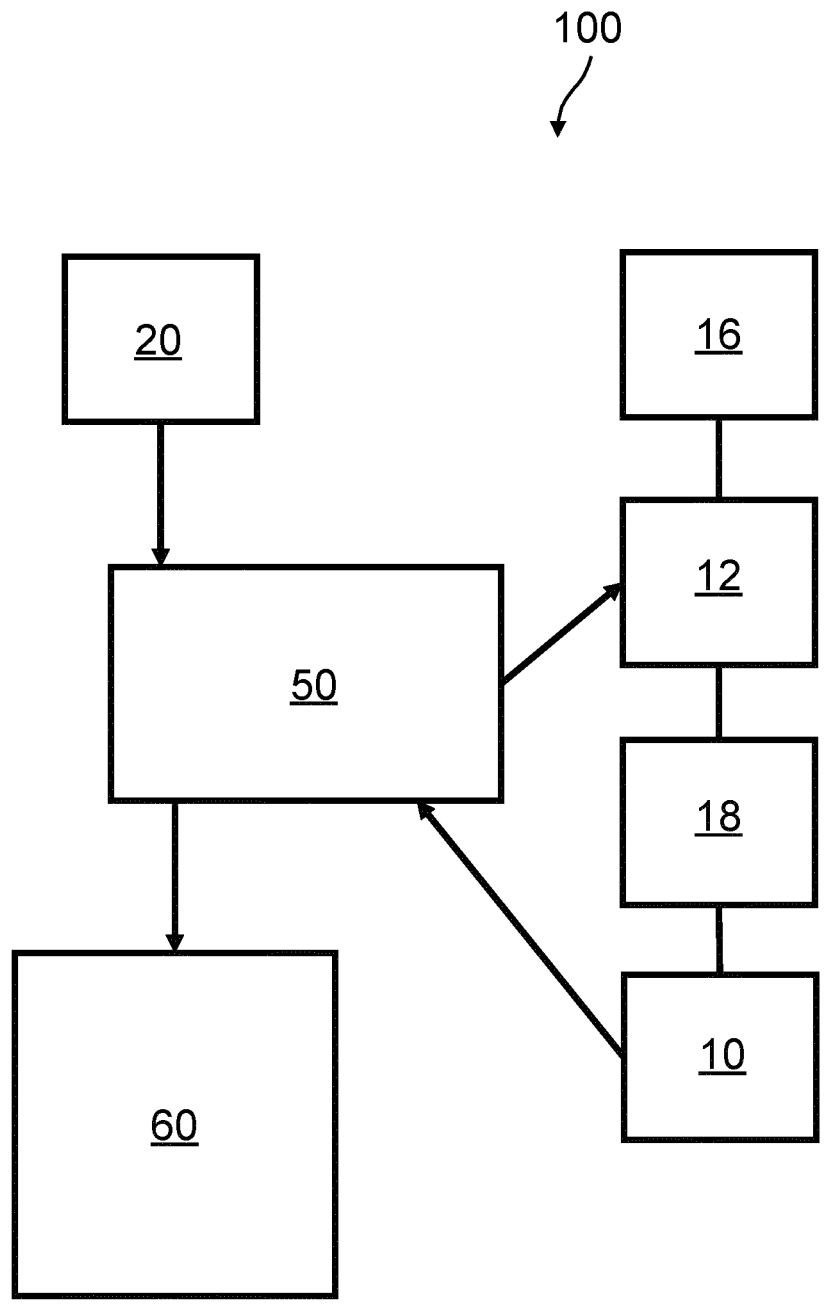
FIG. 1 shows a system diagram of a system for optical communication according to an exemplary embodiment of the invention.

FIG. 1 shows a system diagram of the system 100 for optical communication according to an exemplary embodiment of the invention. A flow chart of the optical and electrical components of the system 100 is shown, which also schematically shows the sequence of the method according to an aspect of the invention.

A locating unit 20 is provided for locating light sources and feeds this information into a data processing system 50 after a light source has been located. An optics unit 16 images the light source onto a mask unit 12, which is switched to an at least partially forwarding state at an area of the mask unit 12 addressed by the information about the located light source and onto which the light source is imaged. As a result, an optical signal from the light source can be forwarded via a second optics unit 18 to the receiving unit 10, where it is received and decoded. For evaluation and further processing, the receiving unit 10 transmits the electrical signal converted therefrom to the data processing system 50. From there, a VR/AR system 60 can be activated using the information decoded therefrom.

Figure 2:
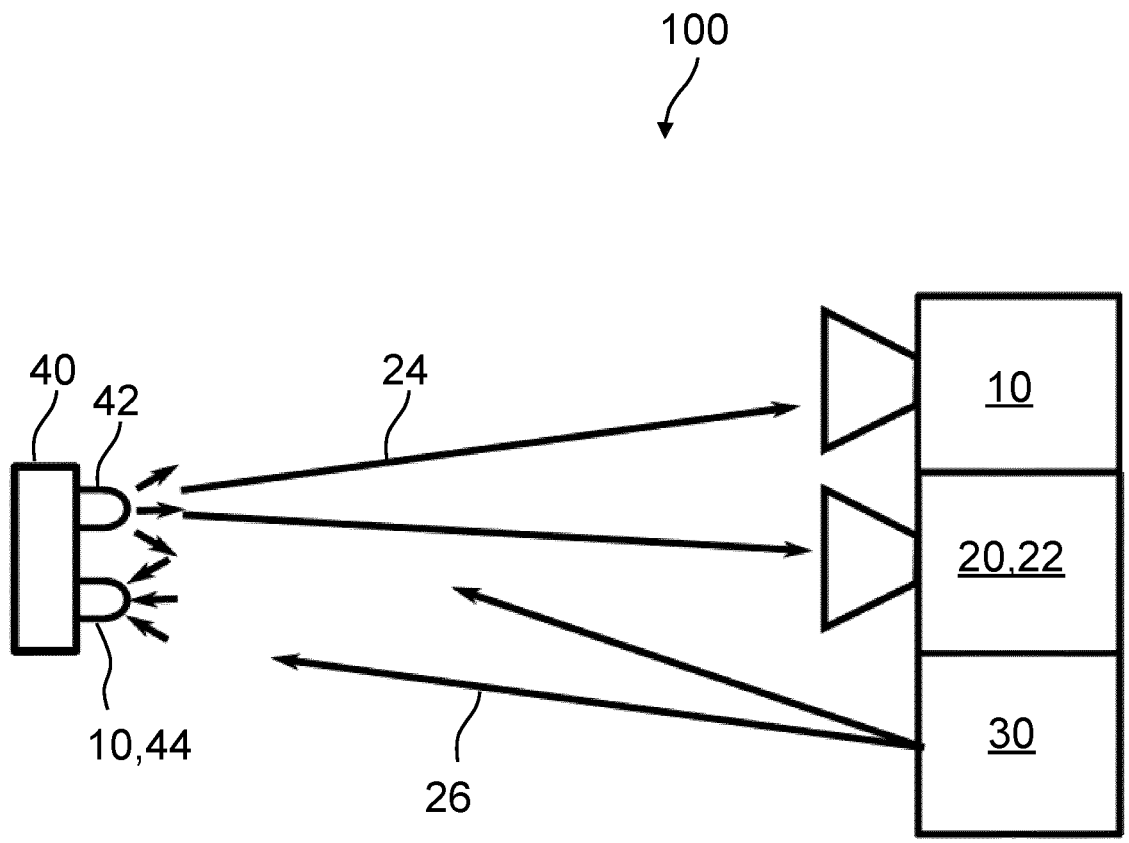
FIG. 2 shows a schematic representation of the system for optical communication according to an exemplary embodiment of the invention.

FIG. 2 shows a schematic representation of the system 100 for optical communication according to an exemplary embodiment of the invention.

The figure shows a possible configuration of the entire system 100. The system 100 is used to locate an optical transmission unit 40 having a light source 42 and a receiving diode 44 and to evaluate its data stream of the optical signals 24. Furthermore, commands and information can be transmitted back to the optical transmission unit 40 via a directed transmission unit 30, which is eye-safe and tap-proof due to a small transmission cone. The transmission unit 40 can be localized using a commercially available digital camera 22 that is sensitive enough in the wavelength range of the transmission unit 40. Here, the signatures of the optically serial signals 24 detectable in the video, such as a point source and temporal fluctuation of the intensity, are selected and identified as candidates for serial communication.

The directed receiving unit 10 can use this information to address the possible light source 42 for serial communication and determine whether a signal 24 that can be evaluated is being received. If this is the case, serial communication can take place.

Figure 3:
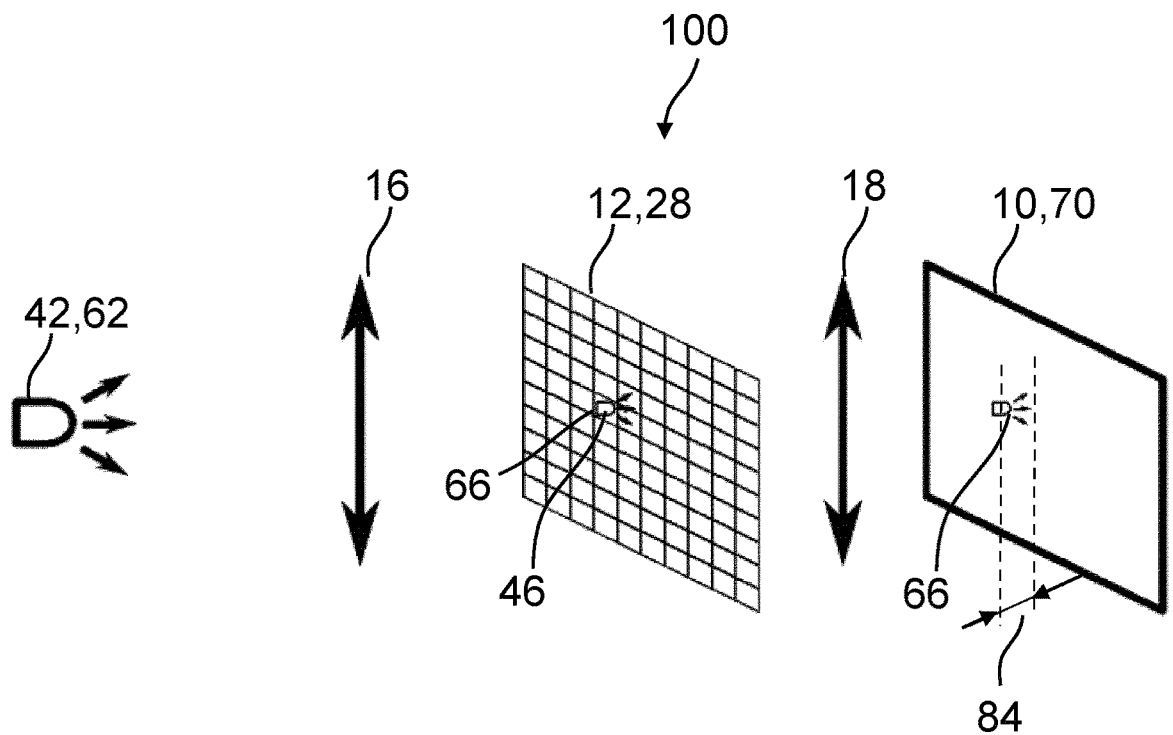
FIG. 3 shows a detailed representation of a receiving process of optical signals via a mask unit of the system according to an exemplary embodiment of the invention.

The system 100 shown in FIG. 2 comprises the optical transmission unit 40, which includes the light source 42, for example in the form of a transmitting diode, for transmitting optical signals 24 and the receiving diode 44 for receiving the optical signals 26. A locating unit 20, which can be designed in particular as a camera 22, can locate the light source 42 via the optical signal 24 emitted by the light source 42. After successful location, the receiving unit 10 can be prepared for a directed reception of the optical signals 24 of the light source 42 via a mask unit 28, which is shown in FIG. 3.

Figure 5:
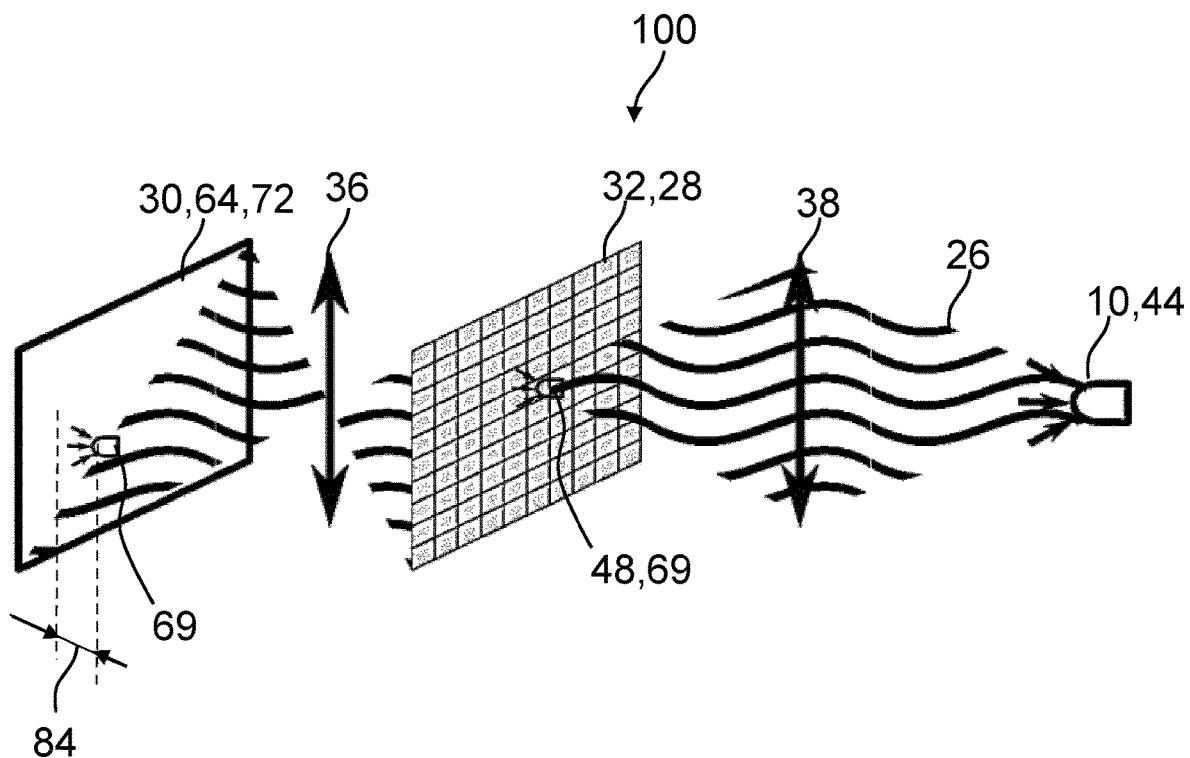
FIG. 5 shows a schematic representation of a transmitting process of optical signals via a mask unit according to a further exemplary embodiment of the invention.
Figure 6:
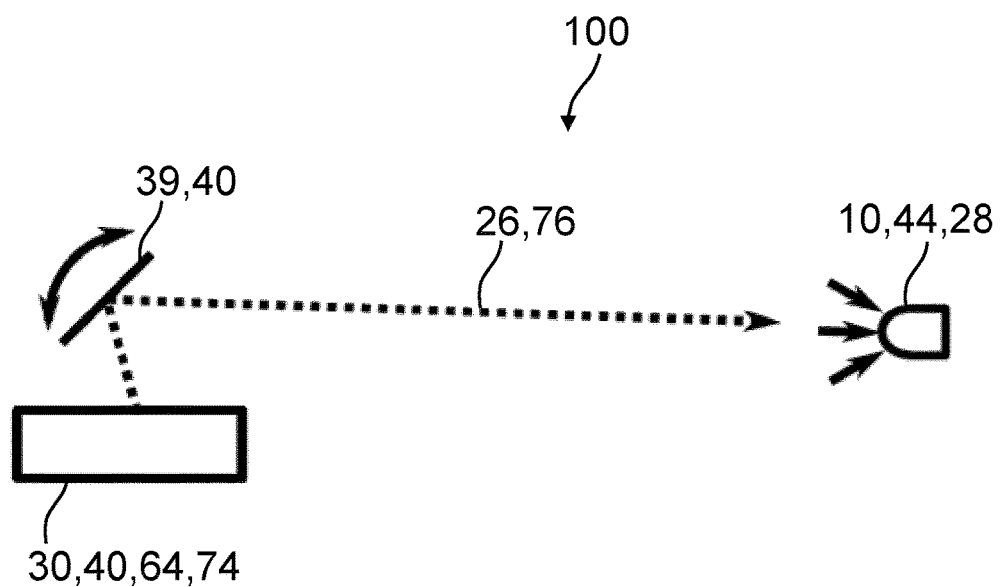
FIG. 6 shows a schematic representation of a transmitting process of optical signals via a deflection mirror according to a further exemplary embodiment of the invention.

The transmitting unit 30, which, as shown in FIGS. 5 and 6, includes a light source 72, 74, transmits optical signals 26, which in turn can be received by the receiving diode 44 as the receiving unit 10. In this way, a bidirectional optical communication between the optical transmission unit 40 and the receiving unit 10 or the transmitting unit 30 can be established.

The light sources 42, 43, 72, 74 shown in FIGS. 2 to 12 for transmitting optical signals 24, 26 and the optical receiving unit 10 for receiving optical signals 24, 26 can advantageously be designed for infrared radiation, in particular according to the IrDA standard.

The optical signals 24 can advantageously include at least one identifier, by means of which the optical signals 24 are pre-filtered for processing and/or display.

FIG. 3 shows a schematic representation of a receiving process of optical signals 24 via a mask unit 28 of the system 100 according to an exemplary embodiment of the invention.

The figure shows the basic structure of the directed receiving unit 10. It is assumed here that the position of the light source 42 is known. This is then imaged onto a mask unit 28 using an optics unit 16. Since the direction/position of the light source 42 is known, the mask unit 28 at the position of the imaged light source 42 can be at least partially switched to forwarding, for example to a transparent state, and can allow the signal to pass. An at least partially forwarding liquid crystal (TFT) screen, for example, can be used as the mask unit 28. The light-emitting area 62 of the light source 42 can then be imaged onto one or more photodiodes 70 directly or also by means of a further optics unit 18.

If the position of the light source 42 is not known, it is also possible to narrow down and thus track relevant signal sources by skillfully alternately switching at least partially forwarding mask units 28.

The system 100 shown in FIG. 3 comprises the light source 42, which can be designed as an LED, for example, for transmitting optical signals 24, in particular serial optical signals 24. The system 100 also comprises the optical receiving unit 10 for receiving the optical signals 24 of the one light source 42 and the mask unit 28, which is arranged between the optical receiving unit 10 and the one light source 42.

The mask unit 28 advantageously includes a dynamic mask 12 that is addressable in a location-resolved manner and is switchable at least in regions between at least partially non-forwarding states and at least partially forwarding states.

An optics unit 16 is arranged in the beam path between the light source 42 and the mask unit 28.

A further optics unit 18, which is optional, is arranged in the beam path between the receiving unit 10 and the mask unit 28.

The mask unit 28, which is embodied as a dynamic mask 12, is switched back and forth at least in areas between an at least partially non-forwarding and at least partially forwarding state. For this purpose, an area 46 of the dynamic mask 12 can be freely addressed and thus switched deliberately to an at least partially non-forwarding state or to an at least partially forwarding state. Advantageously, it is also possible to quickly switch back and forth between the two states.

The optical receiving unit 10 can include at least one photodetector 70 or an arrangement of photodetectors 70, in particular an array of photodiodes 70. The optical signals 24 can be detected in a location-resolved manner in the receiving unit 10 using a plurality of photodetectors 70 and individual light sources 42 can also be assigned in this way, without precise locating by a locating unit 20.

An image 66 of at least one light-emitting area 62 of one light source 42 is projected onto the mask unit 28. In the at least partially forwarding state of the mask unit 28, this image 66 is furthermore imaged on the receiving unit 10. The image 66 of the light source 42 is furthermore imaged onto the receiving unit 10 by means of the further optics unit 18.

A clear distance 84 between the at least one mask unit 28 and/or its image on the at least one receiving unit 10 and an entrance aperture of the at least one receiving unit 10 is at most sufficiently large that a light cone of the image 66, 68, forwarded by the mask unit 28, of at least one light-emitting area 62, 64 of the at least one light source 42, 43, 72, 74 corresponds at most to the entrance aperture of the at least one photodetector 70 of the receiving unit 10. As a result, a very compact system 100 for optical communication can be implemented, which avoids crosstalk between different photodetectors 70 of the receiving unit 10.

The distance 84, also known as Δz, results from:

$$\Delta z \leq D/(2\sin(\alpha))$$

wherein α is half the aperture angle of the imaged light source 42, 43, 72, 74 and D is the diameter of the entrance aperture of the photodetector 70.

For an objective having a focal length f, 2 sin (α) corresponds to the f-number, i.e. at f-number f/2 the maximum distance corresponds to twice the diameter D of the entrance aperture of the photodetector 70.

In this way, the light-emitting area 62 of the light source 42 is imaged onto the dynamic mask 12 of the mask unit 28 via the optics unit 16. The dynamic mask 12 is switched to the at least partially forwarding state at a section 46 where the optical signals 24 from the light source 42 are incident on the dynamic mask 12. In this way, the optical signals 24 can be conducted through to the receiving unit 10.

The light-emitting area 62 imaged on the dynamic mask 12 is imaged on the receiving unit 10 via the optional optics unit 18 when the dynamic mask 12 is in the at least partially forwarding state, and the optical signals 24 are forwarded in this way.

Figure 4:
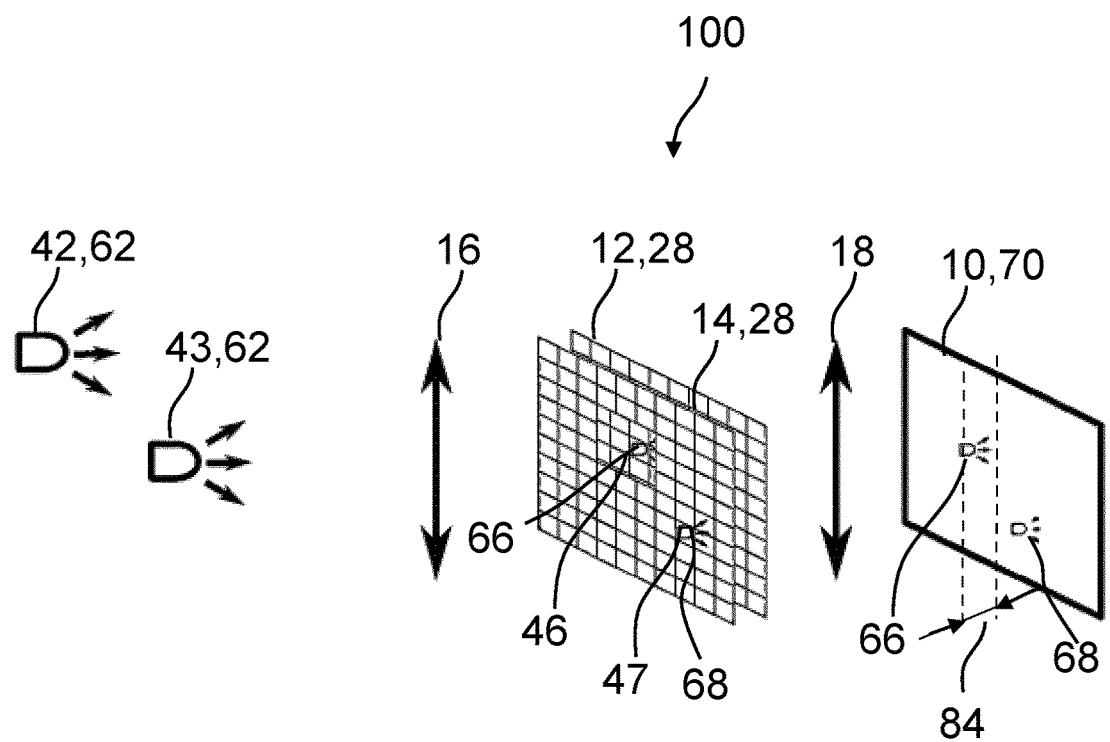
FIG. 4 shows a schematic representation of a receiving process of optical signals using two mask units of the system according to a further exemplary embodiment of the invention.

In each of the exemplary embodiments of FIGS. 3 and 4, the distance 84 between the image 66 of the light source 42 imaged onto the receiving unit 10 by the further optics unit 18 and the receiving unit 10 is marked.

The proposed system 100 offers significant advantages with respect to compact size. A very compact size can be achieved for the system 100, in particular if the receiving unit 10 directly abuts the mask unit 28. A large acceptance angle in the intermediate image of the light source 42 onto the mask unit 28 can thus also be allowed, as a result of which more compact systems 100 are possible.

Advantageously, the distance 84 between the at least one mask unit 28 and/or its image on the at least one receiving unit 10 and the entrance aperture of the at least one receiving unit 10 corresponds at most to a quotient of a diameter of the entrance aperture of at least one photodetector of the receiving unit 10 and an f-number of an optics unit 16, 18 in the beam path between the at least one light source 42 and the at least one mask unit 28. In FIGS. 3 and 4, the distance 84 is almost zero, since the optics unit 18 images the mask unit 28 at the distance 84 shortly in front of or behind the detector plane of the receiving unit 10.

FIG. 4 shows a schematic representation of a receiving process of optical signals 24 using two mask units 28 of the system 100 according to a further exemplary embodiment of the invention.

The figure shows a structure similar to that shown in FIG. 3, but in which two mask units 28 are used in series. This has the advantage that a higher contrast for background suppression can be achieved, and that a simple approximation to a focusability of the mask unit 28 can be achieved. As a result, the contrast can be improved at different distances of the light sources 42, 43, even when multiple light sources 42, 43 are detected simultaneously.

The two mask units 28 include two dynamic masks 12, 14 which are in particular activatable separately from one another. The system 100 includes two light sources 42, 43 having light-emitting areas 62.

An image 66, 68 of the light-emitting area 62 of the two light sources 42, 43 is projected onto the two dynamic masks 12, 14 and, in the at least partially forwarding state of the mask unit 28, is projected onto the receiving unit 10 via the further optics unit 18 and conducted through, where the optical signals 24 of the two images 66, 68 are received by corresponding photodetectors 70.

The two dynamic masks 12, 14 can be switched separately to the at least partially forwarding state for optical signals 24 from at least two light sources 42, 43. In particular, the optical signals 24 of the two light sources 42, 43 can be activated sequentially.

The two light sources 42, 43 can advantageously be located simultaneously using a locating unit 20, in particular a camera 22, in order to switch the two dynamic masks 12, 14 at the corresponding areas 46, 47 to the at least partially forwarding state.

FIG. 5 shows a schematic representation of a transmitting process of optical signals 26 via a mask unit 28 according to a further exemplary embodiment of the invention. In this case, a transmitting unit 30, which includes a matrix of light-emitting elements, for example, is operated according to the same principle as a mask unit 28 having a receiving unit 10 as a transmitting unit 30 having a mask unit 28. In this case, the transmitting unit 30 is imaged onto the mask unit 28 by means of the optics unit 36. Sections 48 of the mask unit 28 which are switched to the forwarding or partially forwarding state are imaged onto the receiving diode 44 of the receiving unit 10 via the further optics unit 38.

FIG. 5 shows an exemplary embodiment which enables bidirectional communication. In this case, the principle of the exemplary embodiments illustrated in preceding FIGS. 3 and 4 is reversed and, instead of a photodetector 70, a photoemitter (LED) 72 having a light-emitting area 64 is used. The emitted light cone 26 is adapted in this case to the receiving unit 10 to be illuminated, which is designed as a receiving diode 44, the position of which is already known by way of the already located light source 42 in the optical transmission unit 40. Using an array of photoemitters 72, multiple communication paths can be provided at the same time. In this case, the distance 84 is defined as the distance between the image 69 of the receiving diode 44 of the receiving unit 10, which is forwarded by the mask unit 28 in the area 48 and is imaged onto the transmitting unit 30 via the optics unit 36.

The system 100 shown in FIG. 5 comprises the transmitting unit 30 having the one or more photoemitters 72 as light sources 72, as well as the mask unit 28 designed as a dynamic mask 32 and the receiver unit 10 designed as a photodiode 44. The optical signals 26, which are emitted by the light-emitting area 64 of the photoemitter 72, are imaged on an area 48 of the dynamic mask 32 via the optional optics unit 36. The area 48 in turn is imaged via the optics unit 38 onto the photodiode 44 of the receiving unit 10, so that the optical signals 26 are forwarded to the photodiode 44 when the area 48 of the dynamic mask 28 is switched to the at least partially forwarding state. The optical signals 26 of the light source 72 can thus be transmitted in a location-resolved manner, since a corresponding area of the light source 72, which can be two-dimensionally extended as a screen, for example, is selected by switching the area 48 to be at least partially forwarding.

By selecting the area 48 of the dynamic mask 32 that is to be switched to be at least partially forwarding, the optical signals 26 of the light source 72 can be transmitted in this way in a directed manner to the optical receiving unit 10.

FIG. 6 shows a schematic representation of a transmitting process of optical signals 26 via a deflection mirror 39 according to a further exemplary embodiment of the invention.

The figure shows an alternative variant in which a laser emitter 74 as the light source 74 of the transmission unit 30 and an electrically adjustable deflection mirror 39 implement the return communication to the optical transmission unit 40.

The system 100 shown in FIG. 6 comprises a transmitting unit 30 implemented as a laser emitter 74, the laser beam 76 of which is directed via the deflection mirror 39 onto the photodiode 44 of the receiving unit 10. The optical signals 26 from the light source 74 can thus be transmitted in a directed manner to the optical receiving unit 10 via the alignment of the deflection mirror 39.

The receiving unit 10 shown in FIG. 6 also comprises a mask unit 28 with at least one dynamic mask 12 as a receiving module in addition to the photodiode 44 for receiving the light beams. This is not shown separately.

The directed transmission of optical signals 26 in the return channel of the optical transmission unit 40 allows undesired communication paths or directions to be suppressed, which enables secure communication. Furthermore, the transmission power can be increased in order to reach less sensitive receiving units 10 even from a greater distance, for example in the order of magnitude of up to ten meters, without exceeding critical luminance levels that could result in eye damage or irritation in casual passers-by.

Figure 7:
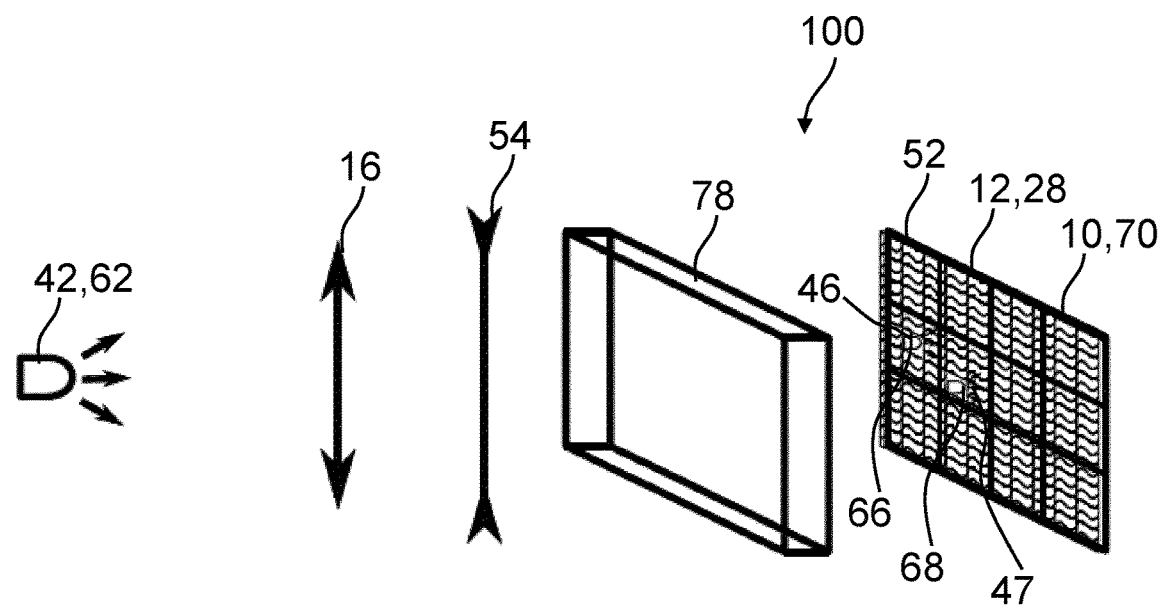
FIG. 7 shows a detailed representation of a receiving process of optical signals via a mask unit of the system according to a further exemplary embodiment of the invention having an additional birefringent optical element and a polarization-rotating element and a quarter-wave plate.
Figure 8:
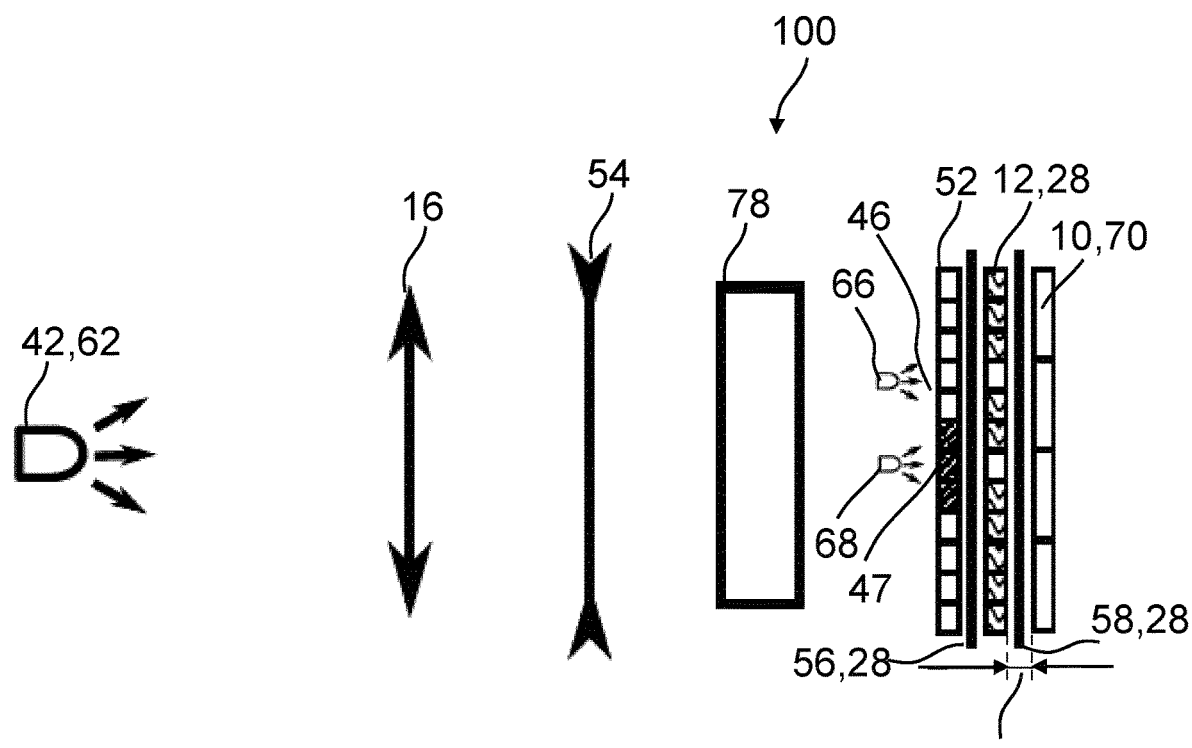
FIG. 8 shows a sectional representation of the system according to FIG. 7.

FIG. 7 shows a detailed representation of a receiving process of optical signals via a mask unit 28 of the system 100 according to a further exemplary embodiment of the invention having an additional birefringent optical element 78 and a polarization-rotating element 52 and a quarter-wave plate 54. FIG. 8 shows a sectional representation of the system 100 according to FIG. 7 for this purpose.

A birefringent optical element 78 followed by a polarization-rotating element 52 is arranged in the beam path between the optics unit 16 and the mask unit 28. The birefringent optical element 78 results in two images 66, 68 of the light source 42. The mask unit 28 includes a dynamic mask 12 arranged between a polarizer 56 and an analyzer 58 in the typical structure of a TFT screen. The distance 84 between the mask unit 28 and the receiving unit 10 is shown including the imaging intermediate optics, the optics unit 16. In fact, the distance 84 is almost zero since the optics unit 16 images the mask unit 28 onto the distance 84 just before/after the detector plane of the receiving unit 10. Between the optics unit 16 and the birefringent optical element 78, a delay element 54 designed as a quarter-wave plate is arranged, for example.

A diffractive optical element 78 can be arranged in front of the mask unit 28 in order to avoid blind spots on a photodetector array of the receiving unit 10. In this way, two or more optical images 66, 68 of the light source 42 can be projected onto different areas of the detector array of the receiving unit 10, so that at least one image always illuminates a photodetector on its sensitive aperture. This is illustrated in FIGS. 7 and 8 by the two images 66, 68 of the light source 42, which are projected onto different sections 46, 47 of the receiving unit 10.

In order to maximize the signal transmission through the mask unit 28 by means of an LCD unit, it is possible to combine the birefringent optical element 78 with a polarization-rotating LCD element 52, in particular as a half-wave delay element. In this way, both polarization components of the transmitted light beams can be separated and components that are mismatched in polarization for the mask unit 28 can be controlled separately, so that a large part of the light is incident on the photodetectors.

Figure 9:
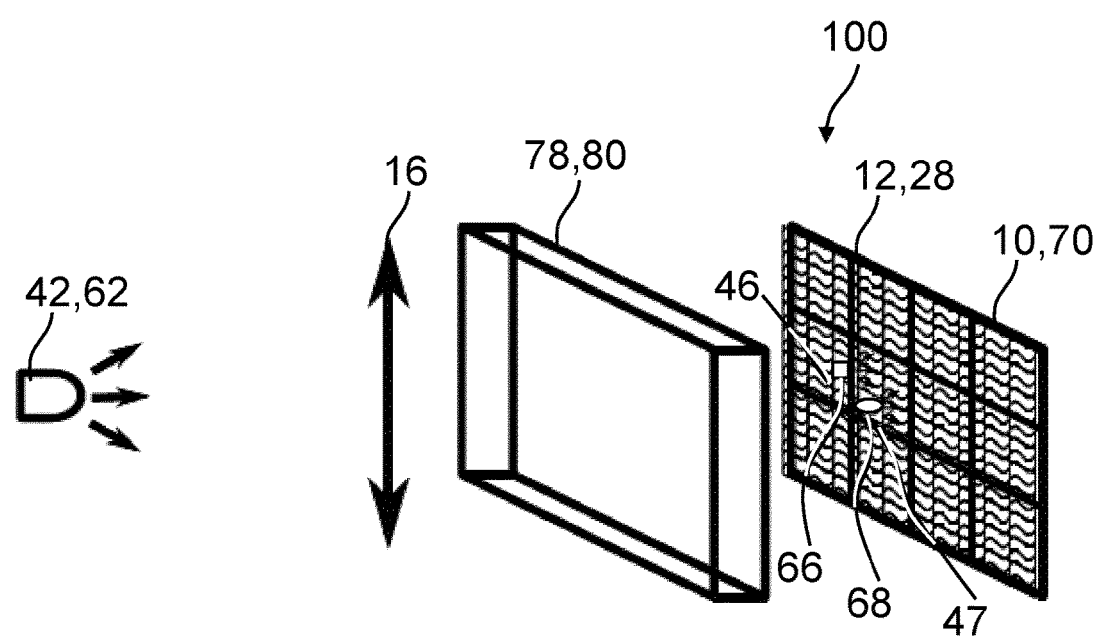
FIG. 9 shows a detailed representation of a receiving process of optical signals via a mask unit of the system according to a further exemplary embodiment of the invention having an additional birefringent optical element or a diffractive optical element.
Figure 10:
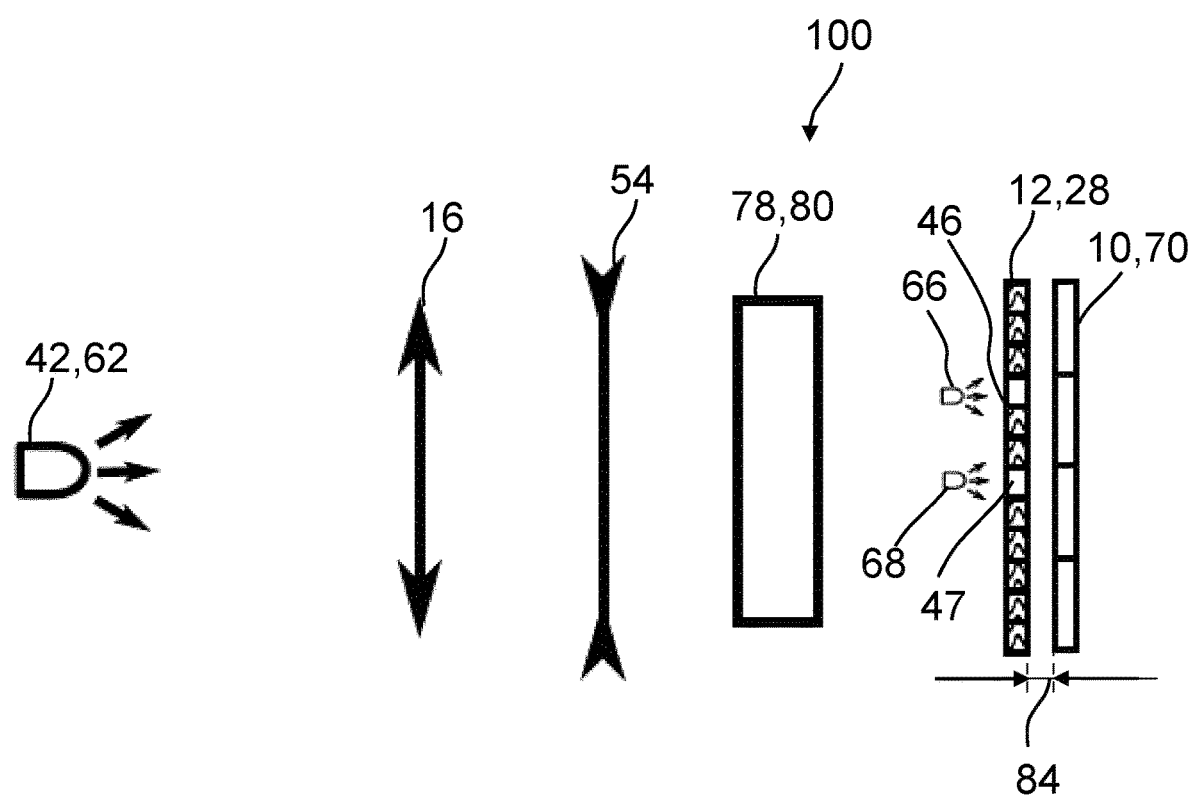
FIG. 10 shows a sectional representation of the system according to FIG. 9.

FIG. 9 shows a detailed representation of a receiving process of optical signals via a mask unit 28 of the system 100 according to a further exemplary embodiment of the invention having an additional birefringent optical element 78 or a diffractive optical element 80. FIG. 10 shows a sectional representation of the system 100 according to FIG. 9 for this purpose.

A birefringent optical element 78 and/or a diffractive element 80 is arranged in the beam path between the optics unit 16, 36 and the at least one mask unit 28. In this case in particular, as shown in FIG. 10, an optional quarter-wave plate can additionally be arranged as a delay element 54 between the optics unit 16, 36 and the birefringent optical element 78 and/or the diffractive optical element 80.

In order to avoid blind spots on a photodetector array of the receiving unit 10, a birefringent optical element 78 and/or a diffractive optical element 80 is installed in front of the mask unit 28, similar to the exemplary embodiment in FIGS. 7 and 8. In this way, two or more optical images 66, 68 of the light source 42 can be projected onto different areas of the detector array of the receiving unit 10, so that at least one image 66, 68 always illuminates a photodetector on its sensitive aperture. This is illustrated in FIGS. 7 and 8 by the two images 66, 68 of the light source 42, which are projected onto different sections 46, 47 of the receiving unit 10.

Figure 11:
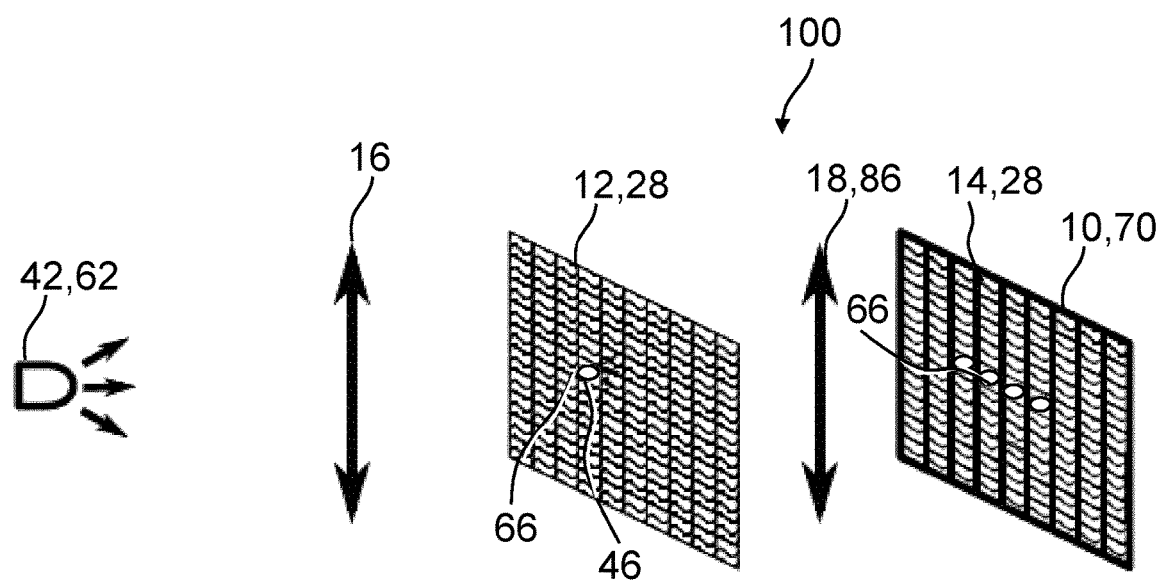
Figure 12:
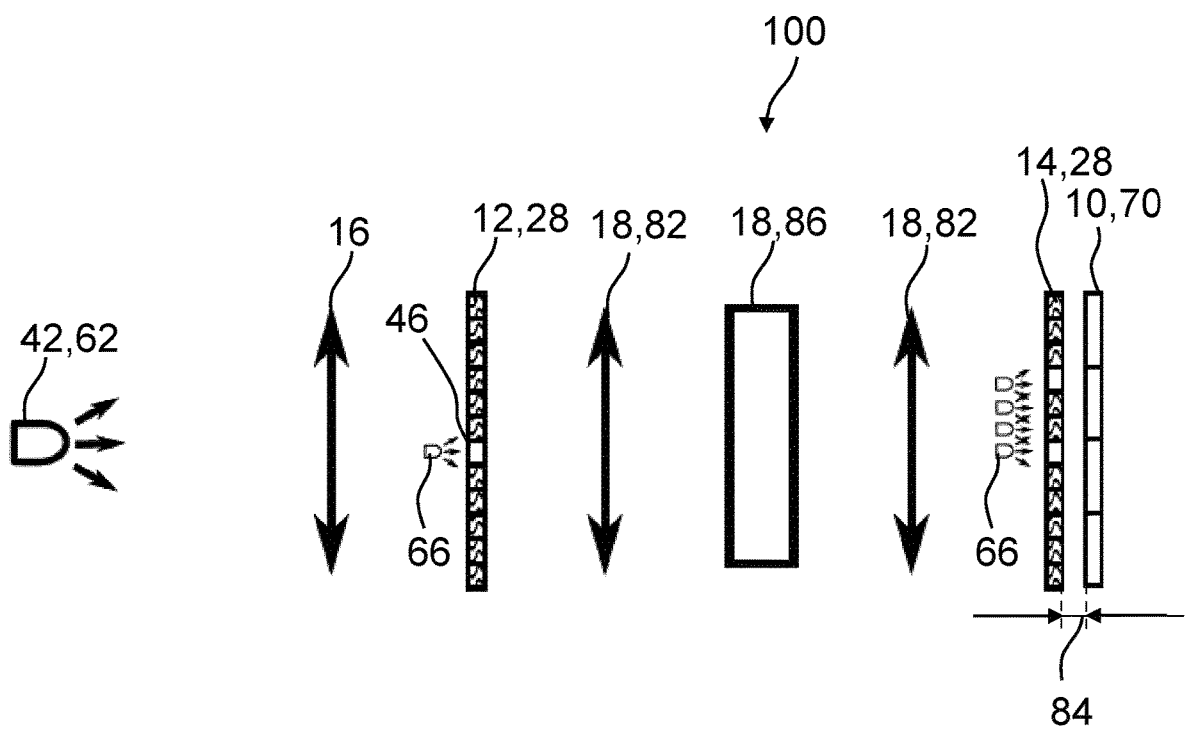
FIG. 12 shows a sectional representation of the system according to FIG. 11.

FIG. 11 shows a detailed representation of a reception process of optical signals via two masks 12, 14 of a mask unit 28 of the system 100 according to a further exemplary embodiment of the invention having a dispersive optical element 86 arranged between them. FIG. 12 shows a sectional representation of the system 100 according to FIG. 11 for this purpose.

A further optics unit 18 is arranged in the beam path between the at least two dynamic masks 12, 14. The optics unit 18 includes a dispersive optical element 86 between two, for example diffractive or refractive, optical elements 82 such as an optical lens or a concave mirror. The optical elements 82 are optional and are therefore not shown in FIG. 11. The optical elements 82 can be diffractive, reflective, refractive.

In this exemplary embodiment, the further optics unit 18 is supplemented by a dispersive optical element 86, for example a transmittive or reflective grating or a prism. This enables spectral splitting of the light beams onto multiple detectors of the receiving unit 10. As a result, the image 66 of the light source 42 is spectrally split and imaged on the mask unit 28 as a spectral band.

A linear arrangement of photodiodes having a large aspect ratio, i.e., in an elongated formation, can be used here in order to minimize the spacing of the photodiodes. Depending on the position of the light source 42, all spectral channels can thus be received simultaneously by the photodetectors. This allows many monochromatic data channels or fewer higher bandwidth polychromatic data channels to be used in the same system architecture. In order to only deliberately address individual "sub-channels", it is also possible to install a further shading mask in front of the photodetectors and to block unwanted channels. In this way, the signal-to-noise ratio can be further optimized in bright surroundings without being restricted to a specific wavelength.

LIST OF REFERENCE SIGNS 10 receiving unit
12 dynamic mask 14 dynamic mask
16 optics unit
18 further optics unit
20 locating unit
22 camera
24 optical signal
26 optical signal
28 mask unit
30 transmitting unit
32 dynamic mask
36 optics unit
38 optics unit
39 deflection mirror
40 transmission unit
42 light source transmitting diode
43 light source transmitting diode
44 receiving diode
46 section
47 section
48 section
50 data processing system
52 delay element
54 delay element
56 polarizer
58 analyzer
60 VR/AR system
62 light-emitting area
64 light-emitting area
66 imaging of light source
68 imaging of light source
69 imaging of receiving unit
70 photodetector
72 photoemitter
74 laser emitter
76 laser beam
78 birefringent optical element
80 diffractive optical element
82 lens/concave mirror
84 distance
86 dispersive optical element
100 system

The invention claimed is:

1. A system for optical communications, comprising
at least one light source for transmitting optical signals;
at least one optical receiving unit for receiving the optical signals of the at least one light source, wherein the optical receiving unit includes at least one photodetector;
at least one mask unit, which is arranged between the optical receiving unit and the at least one light source, and which is designed to be switchable back-and-forth at least in areas between a first optically forwarding state and a second optically forwarding state, the first optically forwarding state being less optically forwarding than the second optically forwarding state,
wherein an image of at least one light-emitting area of the at least one light source can be imaged onto the at least one mask unit and, in the at least partially forwarding state of the at least one mask unit, can be conducted to the receiving unit,
wherein a clear distance between the at least one mask unit and/or its image on the at least one receiving unit and an entrance aperture of the at least one receiving unit is at most of such a size that a light cone of the image forwarded by the mask unit of at least one light-emitting area of the at least one light source corresponds at most to the entrance aperture of the at least one photodetector of the receiving unit.

2. The system as claimed in claim 1, wherein at least one locating unit is provided for locating the at least one light source.

3. The system as claimed in claim 1, wherein the at least one mask unit has at least one dynamic mask that is addressable with location resolution and is switchable at least in areas between first dynamic mask optically forwarding states and second dynamic mask optically forwarding states, the first dynamic mask optically forwarding states being less optically forwarding than the second dynamic mask optically forwarding states.

4. The system as claimed in claim 1, wherein an optics unit is arranged in the beam path between the at least one light source and the at least one mask unit.

5. The system as claimed in claim 4, wherein a birefringent optical element and/or a diffractive optical element is arranged in the beam path between the optics unit and the at least one mask unit.

6. The system as claimed in claim 4, wherein a birefringent optical element followed by a polarization-rotating element is arranged in the beam path between the optics unit and the at least one mask unit.

7. The system as claimed in claim 1, wherein a further optics unit is arranged in the beam path between the receiving unit and the at least one mask unit.

8. The system as claimed in claim 1, wherein the at least one mask unit includes at least two dynamic masks.

9. The system as claimed in claim 8, wherein at least one further optics unit is arranged in the beam path before the at least one dynamic mask and/or after the at least one dynamic mask or between at least two dynamic masks.

10. The system as claimed in claim 1, wherein the at least one light source includes at least one LED and/or at least one photoemitter and/or at least one laser emitter (74) and/or
wherein the at least one light source for transmitting and the optical receiving unit for receiving optical signals are designed as infrared radiation, and/or
wherein the optical receiving unit includes an arrangement of photodetectors.

11. The system as claimed in claim 1, wherein the at least one mask unit includes at least one liquid crystal screen as a dynamic mask.

12. The system as claimed in claim 1, wherein the optical signals include at least one identifier for processing and/or displaying the optical signals.

13. The system as claimed in claim 1, wherein at least one light source for transmitting optical signals and the at least one optical receiving unit are integrated in an optical transmission unit.

14. A method for optical communication using a system for optical communication, wherein
emitting optical signals via at least one light source) emits optical signals;
receiving the optical signals via at least one optical receiving unit, wherein the optical receiving unit includes at least one photodetector,
imaging, on at least one mask unit, which is arranged between the optical receiving unit and the at least one light source, and which can be switched back and forth at least in areas between a first optically forwarding state and a second optically forwarding state, the first optically forwarding state being less optically forwarding than the second optically forwarding state, an image of at least one light-emitting area of the at least one light source and, in the at least partially forwarding state of the at least one mask unit, conducting the image to the receiving unit, wherein a clear distance between the at least one mask unit and an entrance aperture of the at least one receiving unit is at most of such a size that a light cone of image forwarded by the mask unit of the at least one light source corresponds at most to the entrance aperture of the at least one photodetector of the receiving unit.

15. The method as claimed in claim 14, wherein the at least one light source is located by a locating unit.

16. The method as claimed in claim 14, wherein at least one light-emitting area of the at least one light source is imaged via at least one optics unit onto at least one dynamic mask of the at least one mask unit, the at least one dynamic mask being switchable at least in areas between first dynamic mask optically forwarding states and second dynamic mask optically forwarding states, the first dynamic mask optically forwarding states being less optically forwarding than the second dynamic mask optically forwarding states, and the at least one dynamic mask, at a section at which the optical signals of the at least one light source are incident on the at least one dynamic mask, is switched to the second dynamic mask optically forwarding states.

17. The method as claimed in claim 16, wherein two or more images of the light-emitting region of the at least one light source are imaged via a birefringent optical element and/or a diffractive optical element in the beam path between the optics unit and the at least one mask unit as separate images on different sections of the mask unit.

18. The method as claimed in claim 17, wherein different circularly polarized images of the light-emitting area of the at least one light source are optically forwarded via a delay element arranged between the optics unit and the birefringent optical element and/or the diffractive optical element separately to the mask unit.

19. The method as claimed in claim 16, wherein for the mask unit, images, which are mismatched in the polarization, of the light-emitting region of the at least one light source are optically forwarded via a birefringent optical element followed by a polarization-rotating element in the beam path between the optics unit and the at least one mask unit separately to the mask unit, wherein the mask unit includes at least one polarizer followed by a dynamic mask, followed by an analyzer.

20. The method as claimed in claim 16, wherein at least two dynamic masks of the at least one mask unit for optical signals from at least two light sources are switched separately to the second dynamic mask optically forwarding states.

21. The method as claimed in claim 20, wherein the at least two light sources are located simultaneously using the locating unit.

22. The method as claimed in claim 20, wherein a spectral splitting of the optical signals of the at least one light source is carried out via at least one further optics unit in the beam path before the at least one dynamic mask and/or after the at least one dynamic mask or between at least two dynamic masks, wherein the image of the light-emitting area of the at least one light source is imaged spectrally resolved on the second dynamic mask.

23. The method as claimed in claim 14, wherein the optical signals of the at least one light source are transmitted in a location resolved manner.

24. The method as claimed in claim 14, wherein the optical signals of the at least one light source are evaluated in a data processing system.

25. The method as claimed in claim 14, wherein the optical signals of the at least one light source are processed and/or displayed by means of at least one identifier.

* * * * *